Nov. 7, 1939.   S. W. NICHOLSON   2,179,343
REGULATOR MECHANISM FOR VEHICLE WINDOWS
Filed Nov. 11, 1937

Inventor
STANLEY W. NICHOLSON

By  Malcolm W. Fraser
         Attorney

Patented Nov. 7, 1939

2,179,343

UNITED STATES PATENT OFFICE 2,179,343

REGULATOR MECHANISM FOR VEHICLE WINDOWS

Stanley W. Nicholson, Toledo, Ohio, assignor to Detroit Harvester Company, Detroit, Mich., a corporation of Michigan Application November 11, 1937, Serial No. 174,092

1 Claim. (Cl. 268—126)

This invention relates to regulator mechanisms for vehicle windows but particularly to double arm regulators for the windows of automobiles and an object is to produce a simple and efficient regulator of the above character which occupies a minimum amount of space, can be inexpensively manufactured in large scale production and is sturdy and reliable in construction and operation.

Figure 1:
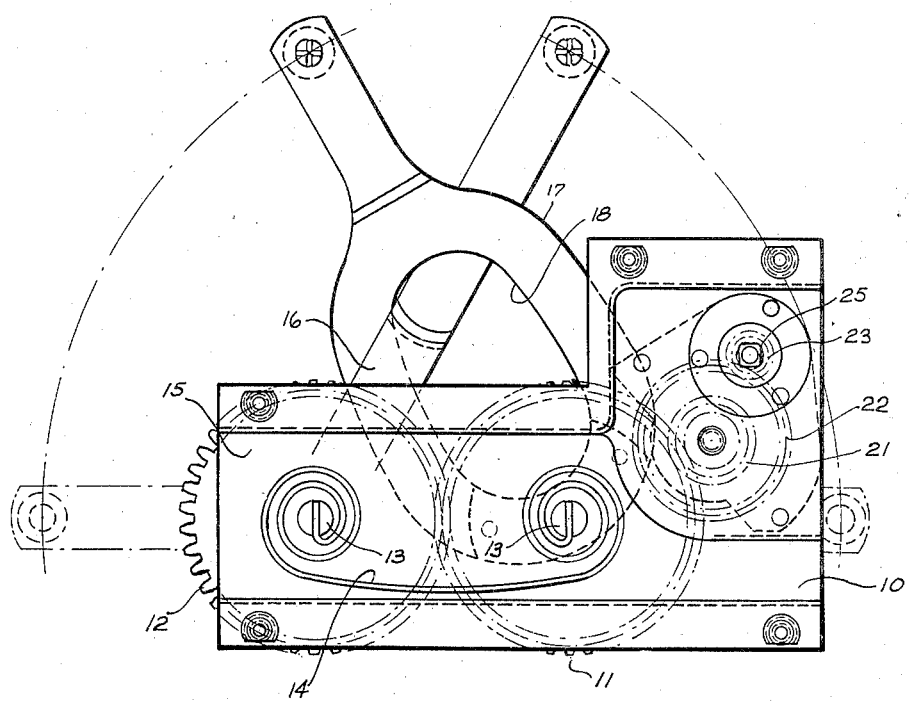
Figure 2:
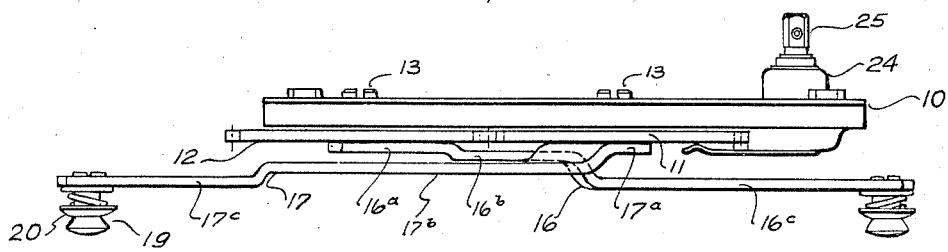

An embodiment of the invention is shown by way of illustration but not of limitation in the accompanying drawing in which Figure 1 is a side elevation of the regulator mechanism; and Figure 2 is an edge view of the mechanism shown in Figure 1.

The illustrated embodiment of the invention comprises a regulator mechanism for automobile windows having a mounting plate 10 which is suitably secured in the door or body of the vehicle in a well-known manner and mounted on the plate 10 are relatively large gears 11 and 12 which mesh with each other. The gears 11 and 12 are secured respectively to studs 13 which extend through the plate 10, the opposite end of each stud being slotted to receive one end of a continuous double spiral counterbalance spring 14.

The mounting plate is embossed at 15 and the spring 14 lies in the recessed portion thereby provided so that the outer edge thereof is substantially flush with the adjacent portion of the plate. Secured to the gear 12 and movable with the respective stud 13 is a swinging arm 16 which in the position shown inclines upwardly and to the right of Figure 1. It will be noted that the inner end portion 16a of the arm 16 lies close against the outer face of the gear 12, an intermediate portion 16b parallel to the portion 16a is stepped outwardly therefrom and the outer end portion 16c is stepped outwardly from the intermediate portion 16b but is substantially parallel with the other arm portions.

Fixed to the outer face of the gear 11 is a swinging arm 17 which in the position shown on Figure 1 inclines upwardly and to the left of the figure, crossing the arm 16. As shown in Figure 1, the inner end portion of the arm 17 is substantially oval shaped providing an opening 18 through which the arm 16 extends, the connecting portion between the arm portions 16b and 16c being disposed in the opening 18 and being adapted to abut against an edge thereof to limit the upward swinging movement of the arms. The arm 17 has a portion 17a which abuts flatly against the outer side of the gear 11 and to which it is rigidly secured and intermediate portions 17b in the form of opposed side portions which are parallel to the portion 17a and an outer portion 17c which is stepped outwardly but is disposed in parallel relation to the other arm portions.

On the outer ends of the arms 16 and 17 are buttons or studs 19 having outer conical portions with which a spring tensioned washer 20 cooperates. The studs 19 engage in the usual longitudinally elongate guide or slot of the retainer fixed to the lower edge of the window glass so that swinging movement of the arms 16 and 17 in one direction moves the window glass in one direction and swinging movement of the arms in the opposite direction moves the window glass in an opposite direction, as will be readily understood. Upon downward swinging movement of the arms 16 and 17, it will be apparent that the spring 14 is placed under a tension to assist in the movement of the arms in the opposite or upward movement.

An important feature of this construction resides in the mounting of the cross arms on the same side of the mounting plate thereby affording a more compact construction and greatly simplifying the construction and arrangement of the parts. Heretofore, it has been necessary in a cross arm regulator to have one arm on one side of the mounting plate and the other arm on the opposite side. This involves a costly and unsatisfactory arrangement. Furthermore, the present construction enables the use of a double spring which was not possible in the previous regulators of this type.

For manually driving the gears 11 and 12, a relatively small gear 21 meshes with the gear 11. The gear 21 is carried by a larger gear 22 with which a pinion 23 forming a part of a spring clutch 24 meshes. The spring clutch is well-known to those skilled in this art and detailed description thereof is not considered necessary. Suffice it to say that the clutch or brake enables the parts to be driven in one direction but prevents retrograde movement thereof. A squared shaft 25 also forming a part of the clutch is adapted to receive the usual crank handle (not shown) for manually operating the regulator.

It is to be understood that numerous changes in details of construction, arrangement and operation may be effected without departing from the spirit of the invention especially as defined in the appended claim.

What I claim is:

Window regulator mechanism comprising a mounting plate, a pair of meshing gears on said plate, means for operating said gears, a pair of cross arms fixed at their inner ends to said gears respectively, the outer end portions of said arms being disposed in a plane parallel to the inner end portions thereof and in substantially the same plane relative to each other, one arm being apertured and the other arm extending freely through such aperture for free swinging movement within a limited arc, the free ends of said arms being adapted to be operatively connected to a window.

STANLEY W. NICHOLSON.